(12) United States Patent
Benisty et al.

(10) Patent No.: US 11,995,327 B2
(45) Date of Patent: May 28, 2024

(54) DATA STORAGE DEVICE AND METHOD FOR ADAPTIVE HOST MEMORY BUFFER ALLOCATION BASED ON VIRTUAL FUNCTION PRIORITIZATION

(71) Applicant: Western Digital Technologies, Inc., San Jose, CA (US)

(72) Inventors: Shay Benisty, Beer Sheva (IL); Judah Gamliel Hahn, Ofra (IL); Ariel Navon, Revava (IL); Alexander Bazarsky, Holon (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/854,312

(22) Filed: Jun. 30, 2022

(65) Prior Publication Data
US 2024/0004561 A1    Jan. 4, 2024

(51) Int. Cl.
*G06F 3/06* (2006.01)

(52) U.S. Cl.
CPC .......... *G06F 3/0631* (2013.01); *G06F 3/0617* (2013.01); *G06F 3/0656* (2013.01); *G06F 3/0659* (2013.01); *G06F 3/0673* (2013.01)

(58) Field of Classification Search
CPC .... G06F 3/0631; G06F 3/0617; G06F 3/0659; G06F 3/0656

USPC .......................................................... 711/154
See application file for complete search history.

(56) References Cited

U.S. PATENT DOCUMENTS

| | | | |
|---|---|---|---|
| 2014/0245300 A1* | 8/2014 | Clegg | G06F 9/45558 718/1 |
| 2016/0203027 A1* | 7/2016 | Challa | G06F 9/45558 718/1 |
| 2016/0323358 A1* | 11/2016 | Malhotra | G06F 12/0891 |
| 2018/0217951 A1* | 8/2018 | Benisty | G06F 13/1642 |
| 2019/0052528 A1* | 2/2019 | Yoshimura | H04L 41/0813 |
| 2019/0278518 A1* | 9/2019 | Byun | G06F 3/061 |

\* cited by examiner

*Primary Examiner* — Hashem Farrokh
(74) *Attorney, Agent, or Firm* — Crowell & Moring LLP

(57) ABSTRACT

A data storage device and method for adaptive host memory buffer allocation based on virtual function prioritization are provided. In one embodiment, a data storage device is provided comprising a memory, an interface, and a controller. The controller is configured to receive priority information of each of a plurality of virtual functions in the host and allocate space in the host memory buffer for each of the plurality of virtual functions based on the priority information. The controller is further configured to dynamically reallocate the space. Other embodiments are possible, and each of the embodiments can be used alone or together in combination.

20 Claims, 9 Drawing Sheets

PF HMB: | Global space | VF#1 | VF#2 | ... | VF#N |

FIG. 7

DATA STORAGE DEVICE AND METHOD FOR ADAPTIVE HOST MEMORY BUFFER ALLOCATION BASED ON VIRTUAL FUNCTION PRIORITIZATION

BACKGROUND

In some storage protocols, a data storage device is allowed to utilize a portion of volatile memory in a host. The use of this memory (which is sometimes referred to as a host memory buffer (HMB)) can be vendor specific. In the Non-Volatile Memory Express (NVMe) specification, the host memory buffer is allocated for exclusive use by the data storage device's controller, data in the host memory buffer is not modified or accessed proactively by the host, and the host notifies the data storage device's controller before reusing the memory space in the host memory buffer for other purposes.

BRIEF DESCRIPTION OF THE DRAWINGS

FIG. 7 is a diagram illustrating an allocation of a physical function's host memory buffer (HMB) space of an embodiment.

DETAILED DESCRIPTION

Overview

Figure 1A:
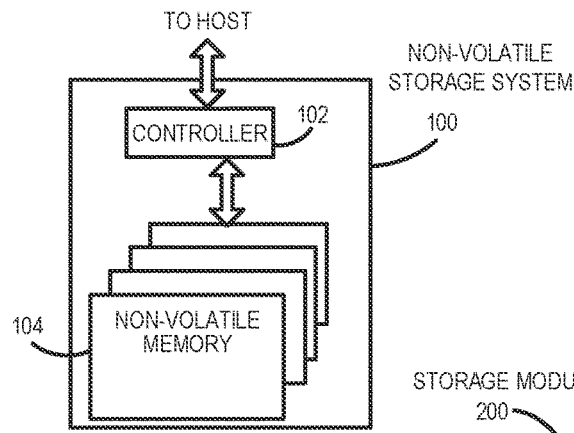
FIG. 1A is a block diagram of a data storage device of an embodiment.

By way of introduction, the below embodiments relate to a data storage device and method for adaptive host memory buffer allocation based on virtual function prioritization. In one embodiment, a data storage device is provided comprising a memory, an interface, and a controller. The controller is configured to receive priority information of each of a plurality of virtual functions in the host and allocate space in the host memory buffer for each of the plurality of virtual functions based on the priority information, wherein more space is allocated to a relatively-higher-priority virtual function than a relatively-lower-priority virtual function.

In some embodiments, the controller is further configured to dynamically reallocate the space allocated in the host memory buffer.

In some embodiments, the space is dynamically reallocated based on new priority information.

In some embodiments, the space is dynamically reallocated based on performance of at least one of the plurality of virtual functions.

In some embodiments, the controller is further configured to reallocate the space during a background operation.

In some embodiments, the controller is further configured to reallocate the space in a single operation cluster during a time dedicated by the host.

In some embodiments, the plurality of virtual functions are associated with a single-root input/output virtualization (SR-IOV) system.

In some embodiments, the controller is further configured to use the space allocated for one of the plurality of virtual functions to cache a flash translation layer entry that is specific to a namespace associated with that virtual function.

In some embodiments, the controller is further configured to use the space allocated for one of the plurality of virtual functions to cache recently-read data and/or recently-written data for that virtual function.

In some embodiments, the controller is further configured to use the space allocated for one of the plurality of virtual functions to store control data for that virtual function.

In some embodiments, the controller is further configured to use the space allocated for one of the plurality of virtual functions to store read-look-ahead data for that virtual function.

In some embodiments, the controller is further configured to use the space allocated for one of the plurality of virtual functions to store history pattern matcher data for that virtual function.

In some embodiments, the memory comprises a three-dimensional memory.

In another embodiment, a method is provided that is performed in a data storage device in communication with a host comprising a host memory buffer and running a plurality of virtual functions. The method comprises: allocating space in the host memory buffer for each of the plurality of virtual functions based on a respective priority of each of the plurality of virtual functions; and dynamically reallocating the space allocated in the host memory buffer.

In some embodiments, the space is dynamically reallocated based on new priority information regarding at least one of the plurality of virtual functions.

In some embodiments, the space is dynamically reallocated based on performance of at least one of the plurality of virtual functions.

In some embodiments, the method further comprises reallocating the space during a background operation.

In some embodiments, the method further comprises reallocating the space in a single operation cluster during a time dedicated by the host.

In some embodiments, the plurality of virtual functions are associated with a single-root input/output virtualization (SR-IOV) system.

In another embodiment, a data storage device is provided comprising a memory and means for allocating space in a host memory buffer for each of a plurality of virtual functions based on a priority associated with each of the plurality of virtual functions.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
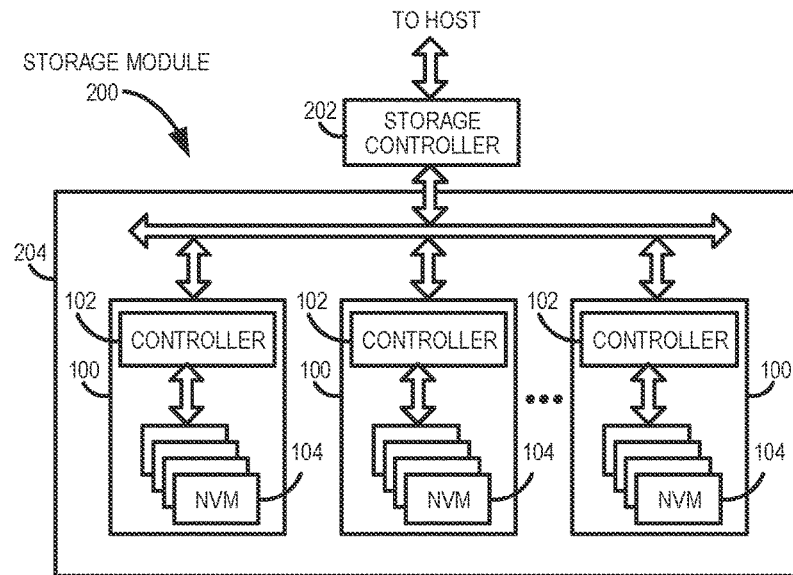
FIG. 1B is a block diagram illustrating a storage module of an embodiment.
Figure 1C:
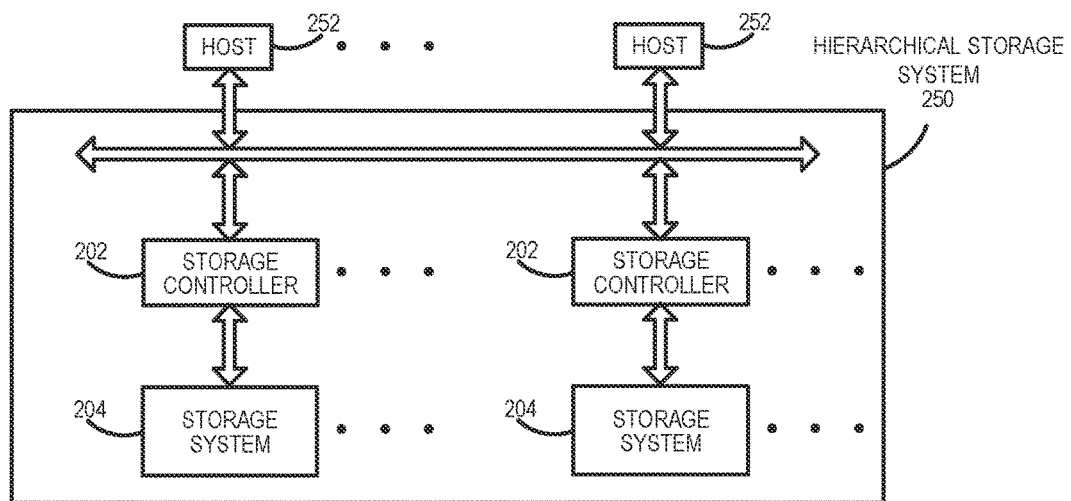
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
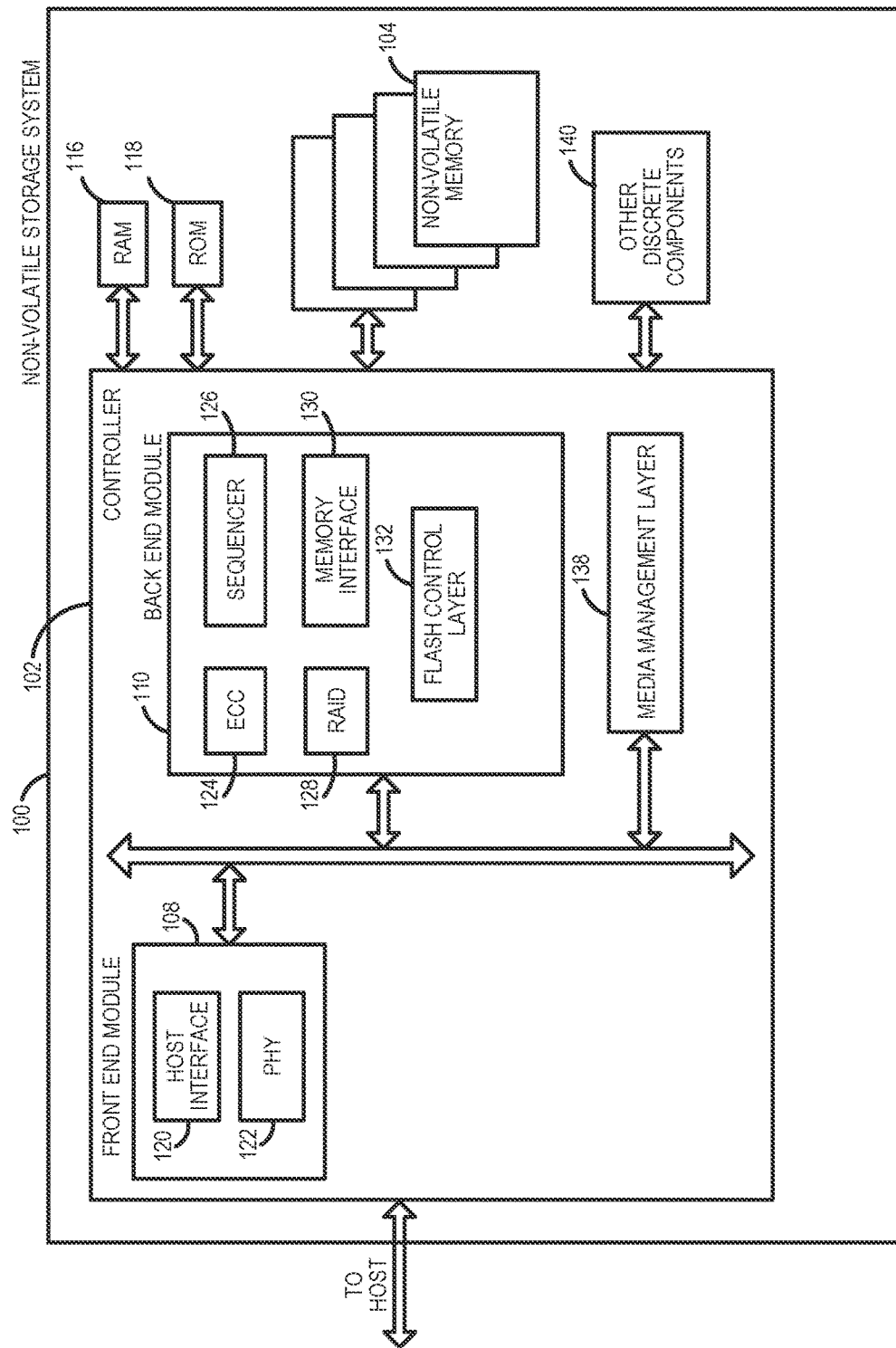
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a selfcontained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
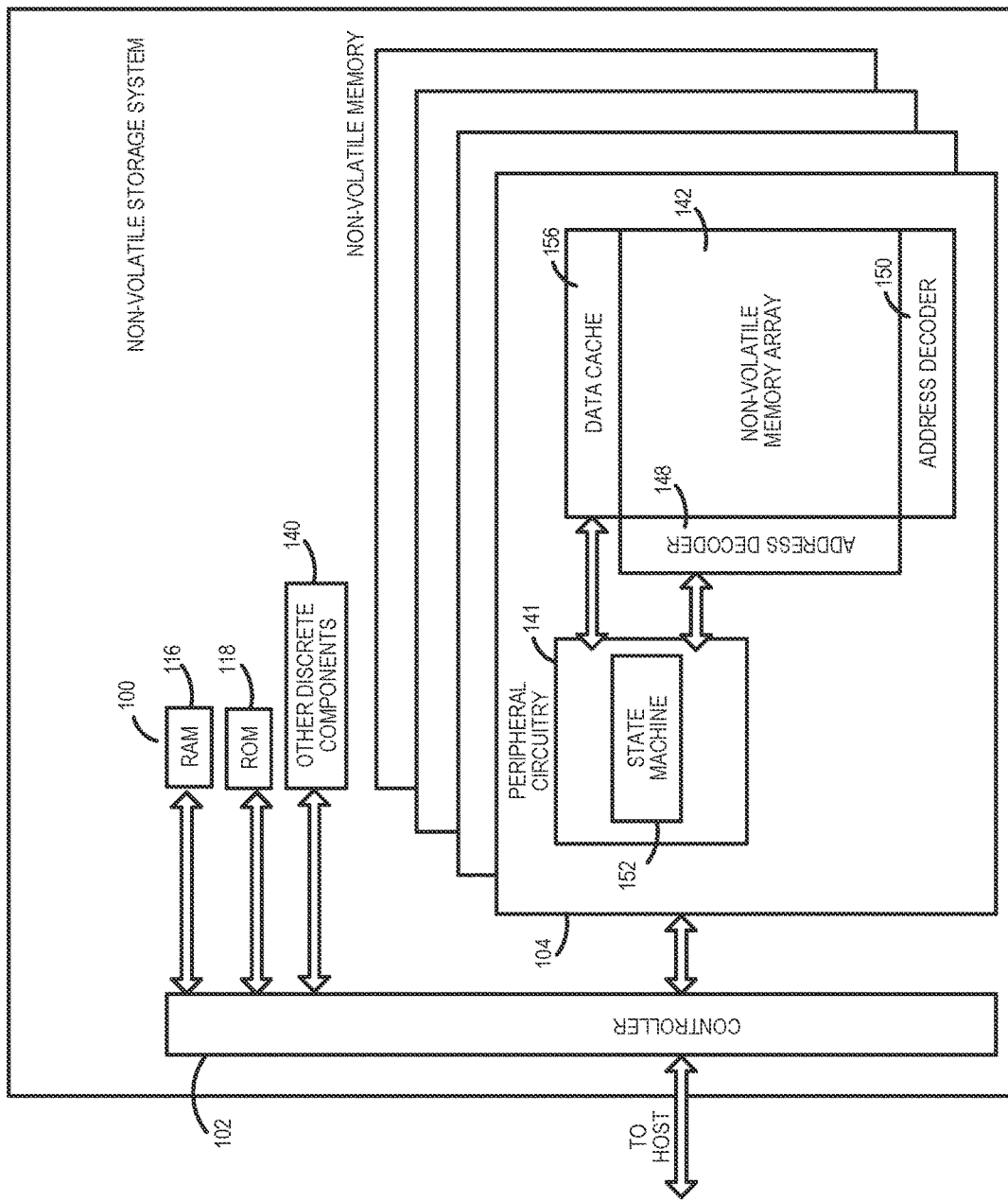
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
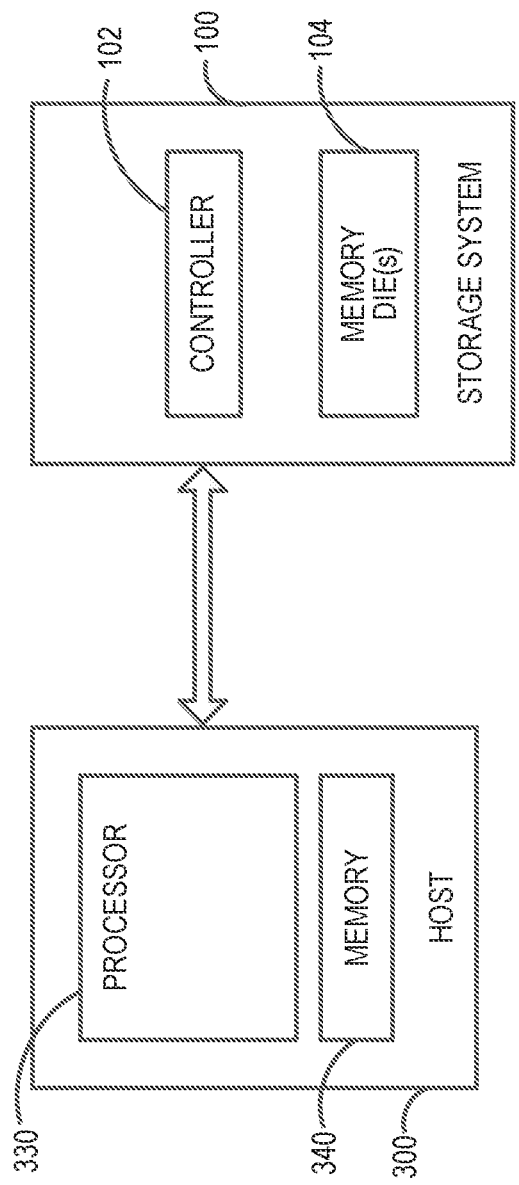
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, in some storage protocols, a data storage device is allowed to utilize a portion of volatile memory in a host. The use of this memory (which is sometimes referred to as a host memory buffer (HMB)) can be vendor specific. For example, in the Non-Volatile Memory Express (NVMe) specification, the host memory buffer is allocated for exclusive use by the data storage device's controller, data in the host memory buffer is not modified or accessed proactively by the host, and the host notifies the data storage device's controller before reusing the memory space in the host memory buffer for other purposes.

Figure 4:
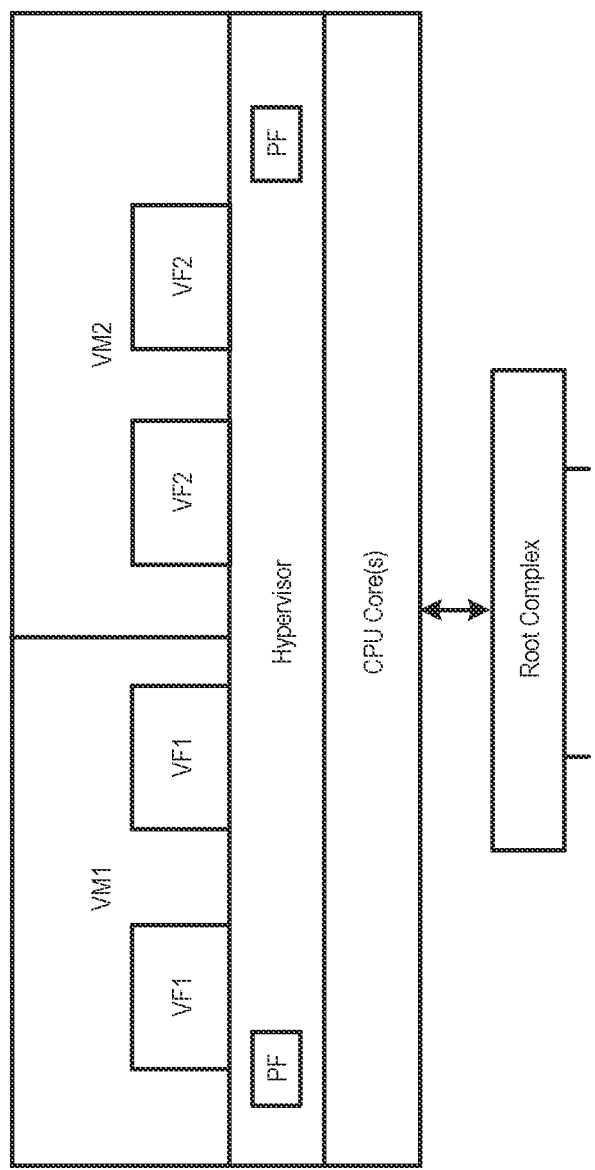
FIG. 4 is a block diagram of a single-root input/output virtualization (SR-IOV) system of an embodiment.

As another example, the single-root input/output virtualization (SR-IOV) interface is an extension to the Peripheral Component Interconnect Express (PCIe) specification and allows a device, such as a network adapter, separate access to its resources among various PCIe hardware functions. The SR-IOV interface allows a PCIe device to appear to be multiple PCIe devices and introduces the concept of physical functions (PF) (full-featured PCIe functions) and virtual functions (VFs) ("lightweight" functions that lack some configuration resources). FIG. 4 is a diagram of an SR-IOV interface of an embodiment. As shown in FIG. 4, the system comprises a root complex, CPU core(s), a hypervisor with two physical functions (PF), and two virtual machines (VM1, VM2), each with two virtual functions (VF1, VF2).

Each PF function may have an HMB space that is currently shared between the VFs equally per demand. The HMB has "global" usages such as storing flash translation layer (FTL) data that relate to all the VFs that correspond to the same PF, and "local" usages such as operating as a cache buffer (for data and control information) or storing read-look-ahead (RLA) or history pattern matcher (HPM) information that relate to each of the VFs alone. It should be noted that while VFs may also theoretically have their own HMB allocations, this may not be advisable due to the need for global information that relates to the primary controller and the device-side complexity of data separation in multiple HMBs.

In some embodiments, HMBs are optional, as the host 300 may choose not to allocate an HMB or may choose to allocate a smaller HMB than requested by the data storage device 100. As such, the primary applications for HMB are those that can improve performance but are not functionally critical. For example, client drives can use an HMB to cache FTL entries. The larger the HMB, the more entries can be cached. The effective cached range of the HMB benefits from higher performance, as the FTL entries do not need to be read from the non-volatile memory 104 each time they are used (but the entire drive can still be read). Standard cache-management algorithms can be used to optimize the space provided. This same principle can apply to VF HMBs. While a VF can function without an HMB, allocating some HMB "locally" for each VF can improve the latency and performance of that particular VF.

Figure 5:
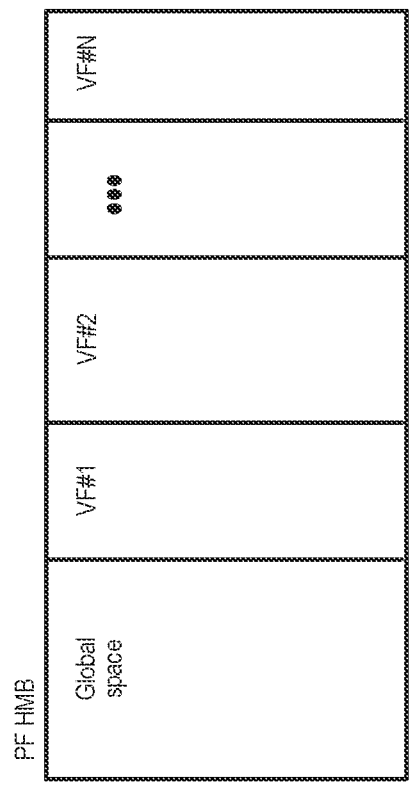
FIG. 5 is a diagram illustrating an allocation of a physical function's host memory buffer (HMB) space of an embodiment.

Currently, data storage devices do not have any prioritization between the VFs that use the HMB in a PF. The HMB space is divided by the data storage device in whatever way desired, and the HMB space is considered a single unit from the host-allocation perspective. For example, FIG. 5 shows an example of this space allocation of a PF HMB for a system with N different VFs. As mentioned above, the global space contains PF global data that is relevant for all VFs, such as FTL data.

In the following embodiment, the data storage device's function can be improved by considering the priority of each of the VFs that are connected to the same PF when allocating HMB space. This may be especially useful in data storage devices that use an SR-IOV interface that have functions that differ considerably in priority. For example, in data storage devices used in the automotive market, a VF that handles autonomous driving may be significantly more important than a VF that handles media playback.

In one embodiment, the data storage device's controller 102 is configured to allocate the HMB space of each PF for VFs according to a priority set by each of the VFs. The allocated space may also change dynamically due to changes in the system if priority is shifted during operation. The HMB space that serves a VF may be operated for different purposes, making the higher-priority VFs operate faster and consume less power.

Figure 6:
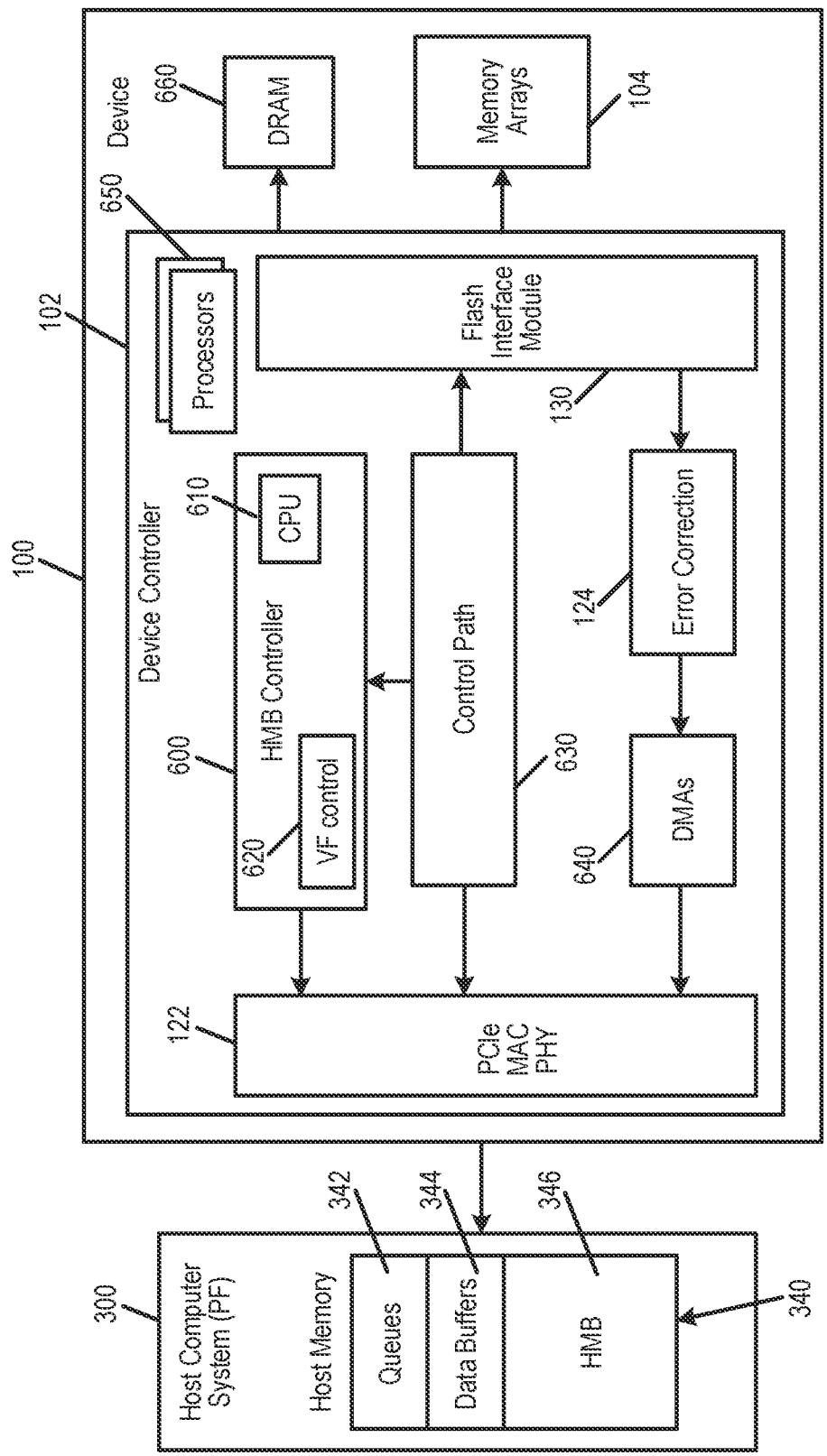
FIG. 6 is a block diagram of a host and data storage device of an embodiment.

FIG. 6 is another block diagram of the data storage device 100 and host 300 that illustrate some components that can be used in this embodiment. It should be noted that this depiction is merely an example and other configurations can be used. As shown in FIG. 6, the host 300, which operates the PF, comprises a memory 340 that contains queues 342, data buffers 344, and a host memory buffer (HMB) 346. The data storage device 100 comprises a controller 102, volatile memory (here, DRAM) 660, and non-volatile memory arrays (here, NAND) 104. The controller 102 comprises a host interface (here, a PCIe media access control (MAC) physical layer (PHY)) for interfacing with the host 300, and a flash interface module 130 for interfacing with the volatile and non-volatile memories 660, 104. The controller 102 also comprises an HMB controller 600, a control path 630, direct memory access (DMA) controllers 640, an error correction module 124, and one or more processors 650. The HMB controller 600 comprises a CPU 610 and a VF controller 120. The VF controller 120, which can be hardware and/or software, is configured to control the allocation of memory for the VFs in the HMB 340.

Figure 7:
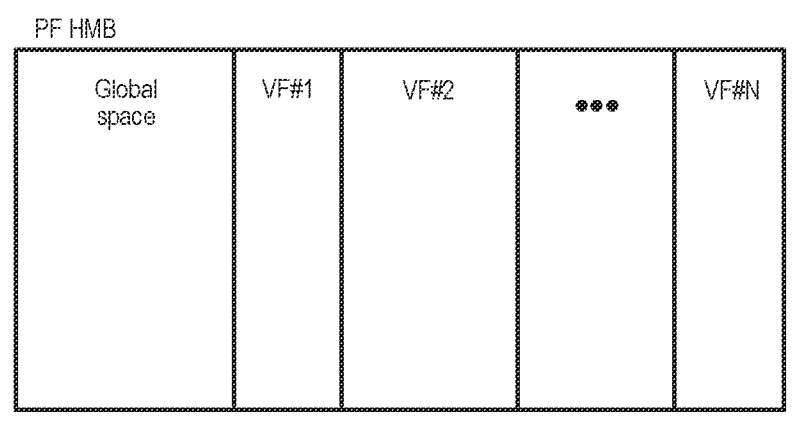

In this embodiment, the HMB space is divided between the VFs according to their respective priority defined by the host 300 (e.g., at boot or dynamically when the system is running). FIG. 7 depicts how the HMB space may look after the division. As compared to the depiction in FIG. 5, FIG. 7 shows that the global space is not impaired but that the total space that is allocated for the VFs is divided differently according to their respective priority. In the example shown in FIG. 7, VF #2 is given a larger space than VF #1.

There are manty different usages for the VF space. For example, the VF space can be used as a cache buffer to cache FTL entries that are specific to namespaces exclusively attached to that VF, to store recently-read/written data or other "hot" data that can be used for faster performance, or to store control data, such as NVMe-related pointers. The VF space can also be used for a read-look-ahead (RLA) mechanism to read data from the memory 104 ahead of a host read command for the data, which can be useful in sequential read. Additionally, the VF space can be used for a history pattern matcher (HPM) RAM (HPM-RAM) to store tables that are used during the operation of predicting the next random read address ahead of the host random read command by analyzing the history of its read patterns. The controller 102 may allocate a different HPM-RAM budget per each VF and change it dynamically. It should be noted that these are merely examples, and other use cases can be used.

These embodiments can be implemented in any suitable way. For example, the priority of the VF can be defined when the system is initialized and/or can be modified during the operation of the system to accommodate changes in the environment. In this scenario, a modification in the space allocation of the HMB can be pursued and can happen gradually during background operation time or in a single operation cluster during some period dedicated by the host 300.

In another embodiment, HMB capacity allocation is done dynamically even when the priorities of the VFs are fixed. The algorithm can consider the status of the other VFs. For instance, when one VF is in local stress while the other VFs are in idle, the first VF may use HMB chunks of the other VFs for a short period in order to accelerate the pending tasks. The same works for exception scenarios in which completing the pending operations is critical. In another embodiment, the data storage device's controller 102 can take into account the value in having the HMB for the various VFs. If, for example, the first VF is the highest priority but performance results are the same even without the HMB, its HMB chunk (or part of it) can be allocated to other VFs.

Figure 8:
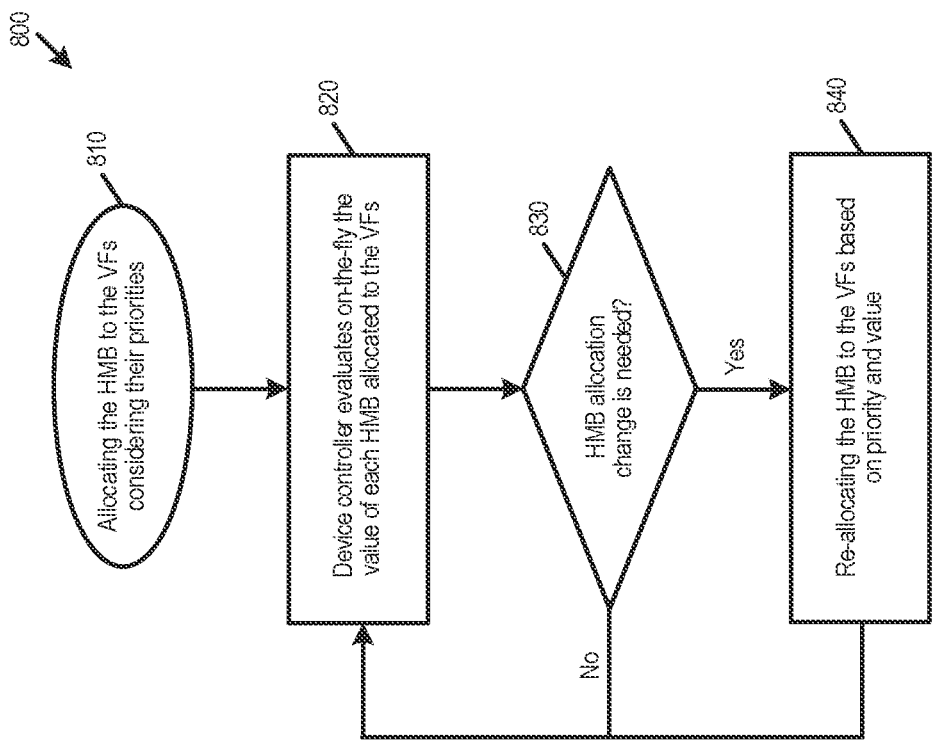
FIG. 8 is a flow chart of a method of an embodiment for re-allocation of HMB space to virtual functions considering value in history and priority.

FIG. 8 is a flow chart 800 of a method of an embodiment for re-allocation of HMB space to virtual functions considering value in history and priority. As shown in FIG. 8, the HMB is initially allocated to VFs considering their priorities (act 810). Then, the data storage device's controller 102 evaluates, on-the-fly, the value of each HMB allocated to the VFs (act 820). The controller 102 then determines if a change is needed to the HMB allocation (act 830). If no change is needed, the method loops back to act 820. However, if a change is needed, the controller 102 reallocates the HMB to the VFs based on priority and value (act 840).

There are many advantages associated with these embodiments. For example, these embodiments can be used to improve the function of a system by considering the priority of each of the VFs that are connected to the same PF when allocating HMB space. This can result in a more-efficient system that has better quality of service, which can be a critical parameter in the automotive segment, for example. Also, these embodiments can be especially useful in data storage devices that use SR-IOV with functions that considerably differ in priority, such as in the automotive market where there can be different priority VFs (e.g., one the handles security measures and one that handles media playback).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory;
   an interface configured to communicate with a host comprising a host memory buffer; and
   one or more processors configured, individually or in combination, to communicate with the memory and the interface, wherein the one or more processors are further configured, individually or in combination, to:
      receive priority information of each virtual function of a plurality of virtual functions in the host; and
      allocate space in the host memory buffer for each virtual function based on the priority information, wherein more space is allocated to a relatively-higher-priority virtual function than a relatively-lower-priority virtual function;
   wherein:
      the host memory buffer is allocated for exclusive use by the one or more processors; and
      data stored in the host memory buffer by the one or more processors is not accessible proactively by the host.

2. The data storage device of claim 1, wherein the one or more processors are further configured, individually or in combination, to dynamically reallocate the space allocated in the host memory buffer.

3. The data storage device of claim 2, wherein the one or more processors are further configured, individually or in combination, to dynamically reallocate the space based on new priority information.

4. The data storage device of claim 2, wherein the one or more processors are further configured, individually or in combination, to dynamically reallocate the space based on performance of at least one of the plurality of virtual functions.

5. The data storage device of claim 2, wherein the one or more processors are further configured, individually or in combination, to reallocate the space during a background operation.

6. The data storage device of claim 2, wherein the one or more processors are further configured, individually or in combination, to reallocate the space in a single operation cluster during a time dedicated by the host.

7. The data storage device of claim 1, wherein the plurality of virtual functions is associated with a single-root input/output virtualization (SR-IOV) system.

8. The data storage device of claim 1, wherein the one or more processors are further configured, individually or in combination, to use the space allocated for one of the plurality of virtual functions to cache a flash translation layer entry that is specific to a namespace associated with that virtual function.

9. The data storage device of claim 1, wherein the one or more processors are further configured, individually or in combination, to use the space allocated for one of the plurality of virtual functions to cache recently-read data for that virtual function.

10. The data storage device of claim 1, wherein the one or more processors are further configured, individually or in combination, to use the space allocated for one of the plurality of virtual functions to store control data for that virtual function.

11. The data storage device of claim 1, wherein the one or more processors are further configured, individually or in combination, to use the space allocated for one of the plurality of virtual functions to store read-look-ahead data for that virtual function.

12. The data storage device of claim 1, wherein the one or more processors are further configured, individually or in combination, to use the space allocated for one of the plurality of virtual functions to store history pattern matcher data for that virtual function.

13. The data storage device of claim 1, wherein the memory comprises a three-dimensional memory.

14. A method comprising:
    performing the following in a data storage device in communication with a host comprising a host memory and running a plurality of virtual functions:
       allocating space in the host memory for each virtual function of the plurality of virtual functions based on a respective priority of each virtual function; and
       dynamically reallocating the space allocated in the host memory in a single operation cluster during a time dedicated by the host.

15. The method of claim 14, wherein the space is dynamically reallocated based on new priority information regarding at least one of the plurality of virtual functions.

16. The method of claim 14, wherein the space is dynamically reallocated based on performance of at least one of the plurality of virtual functions.

17. The method of claim 14, wherein the space is dynamically reallocated during a background operation.

18. The method of claim 14, wherein the plurality of virtual functions is associated with a single-root input/output virtualization (SR-IOV) system.

19. A data storage device comprising:
    a memory;
    means for allocating space in host storage for each virtual function of a plurality of virtual functions based on a priority associated with each virtual function; and
    means for using use the space allocated for one of the plurality of virtual functions to cache a flash translation layer entry that is specific to a namespace associated with that virtual function, cache recently-read data and/or recently-written data for that virtual function, store control data for that virtual function, store read-look-ahead data for that virtual function, and/or store history pattern matcher data for that virtual function.

20. The data storage device of claim 1, wherein the one or more processors are further configured, individually or in combination, to use the space allocated for one of the plurality of virtual functions to cache recently-written data for that virtual function.

\* \* \* \* \*